UNITED STATES PATENT OFFICE.

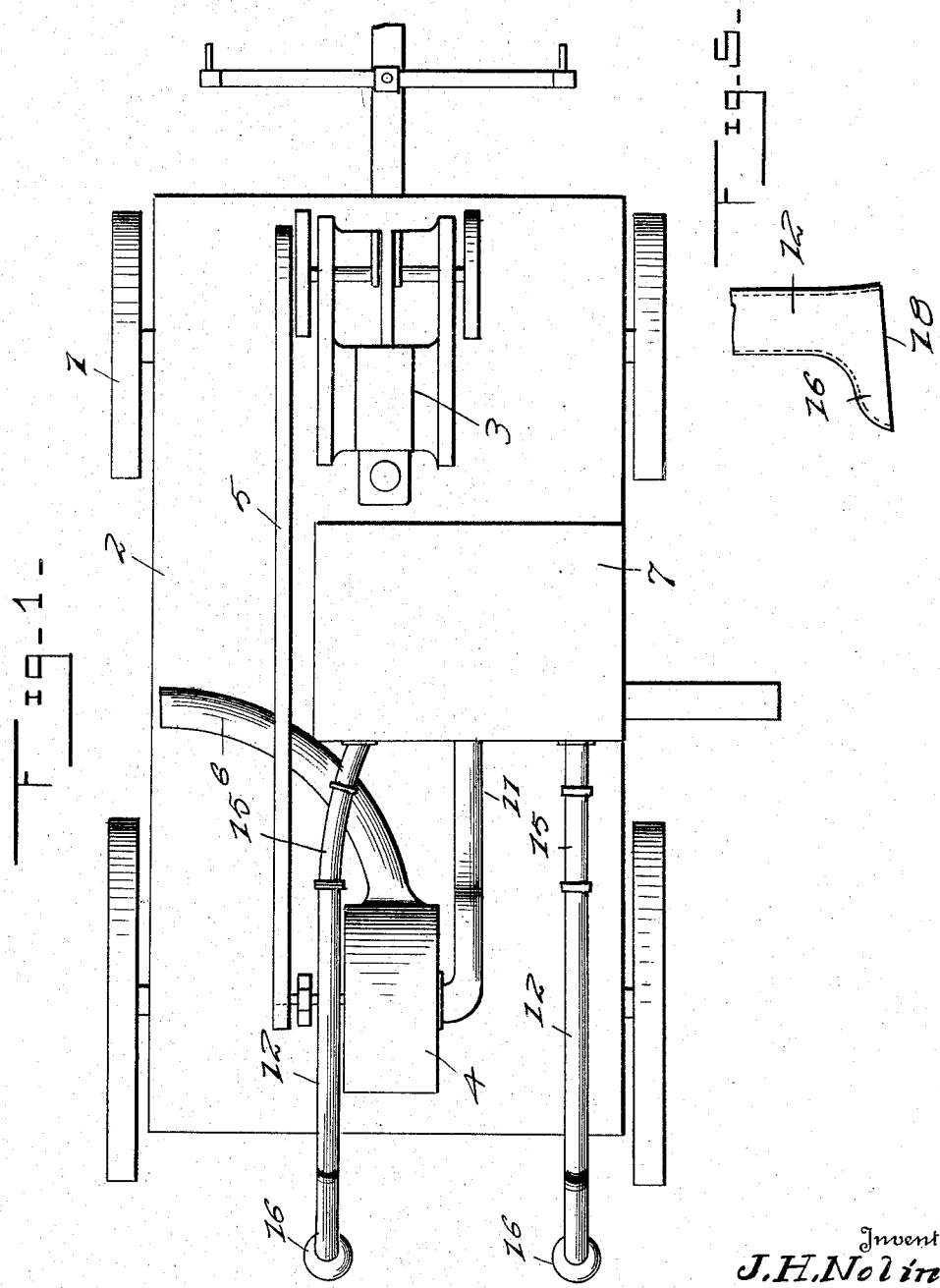

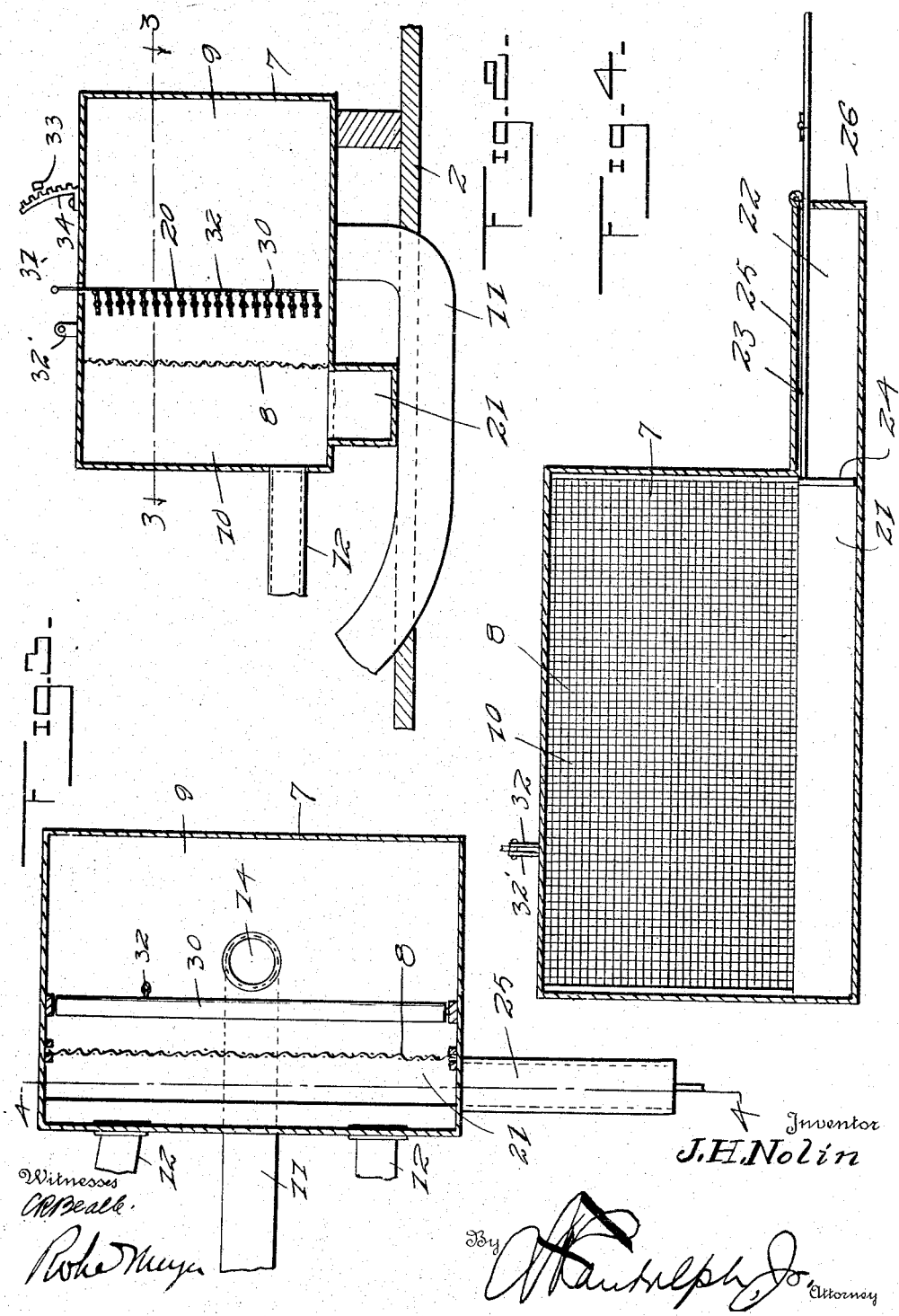

JAMES H. NOLIN, OF NEW BROCKTON, ALABAMA.

BOLL-WEEVIL-DESTROYING MACHINE.

1,223,415. Specification of Letters Patent. Patented Apr. 24, 1917.

Application filed July 7, 1916. Serial No. 108,032.

*To all whom it may concern:*

Be it known that I, JAMES H. NOLIN, a citizen of the United States, residing at New Brockton, in the county of Coffee and State of Alabama, have invented certain new and useful Improvements in Boll-Weevil-Destroying Machines; and I do hereby declare the following to be a full, clear, and exact description of the invention, such as will enable others skilled in the art to which it appertains to make and use the same.

This invention relates to a machine for destroying boll weevil, and the primary object of the invention is to provide a device which may be mounted upon the running gear of an ordinary farm wagon and which includes a suction device for sucking the boll weevils from the small cotton plants into a suitable receptacle, from whence they may be withdrawn as desired.

Another object of this invention is to provide, in a boll weevil destroying machine as specified, a casing which is provided with a vertical foraminous or screen partition, dividing the casing into two compartments, one of which has communication with the inlet of an ordinary rotary suction fan, and the other of which has a plurality of flexible nozzles connected thereto for sucking the boll weevils from the cotton plants, so that the boll weevils, trash, small sticks or the like which are drawn upwardly through the nozzle will be prevented by the foraminous partition from entering the chamber of the receptacle with which the suction or inlet of the fan communicates.

A further object of this invention is to provide a valve, of the shutter type which is carried by the receptacle intermediate the fan inlet and the foraminous partition, so that the suction through the foraminous partition and the boll weevil gathering tubes may be cut off by the closing of the valve structure, for permitting the boll weevils, trash or the like which might be held against the foraminous partition by the air suction, to fall therefrom into a suitable trough carried by the bottom of the receptacle, from which trough the boll weevils and trash are removed by an ordinary rake structure.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved machine.

Fig. 2 is a fragmentary vertical section through the machine illustrating the receptacle with which the fan inlet communicates, and showing the shutter valve structure in an open position.

Fig. 3 is a horizontal section on the line 3—3 of Fig. 2.

Fig. 4 is a vertical section on the line 4—4 of Fig. 3, and

Fig. 5 is a detail view of the foot of one of the suction members.

Referring more particularly to the drawings, 1 indicates the running gears of an ordinary farm wagon, which has a bed or platform 2 mounted thereon.

An internal combustion engine or prime mover 3 of any ordinary type is carried by the front end of the platform 2, and it is connected to an ordinary rotary fan 4 by means of a belt or analogous power transmitting device 5. The outlet of the fan casing 4 is through a pipe 6, which pipe curves outwardly to one side of the bed 1.

A receptacle 7 is carried by the platform 2 and it has a foraminous or screen partition 8 extending vertically therein and dividing the interior of the receptacle into a front compartment 9 and a rear compartment 10. The inlet of the fan 4 communicates with the interior of the compartment 9 through a pipe 11, as clearly shown in Figs. 2 and 3 of the drawings.

A pair of pipes 12 are connected to the casing 7, and have direct communication with the compartment 10, being positioned upon the opposite side of the foraminous partition 8 from the opening 14 through which the pipe 11 has communication with the compartment 9 so that the air suction of the fan will pass upwardly through the pipes 12 through the partition 8 into the compartment 9 and downwardly through the pipe 11 into the fan casing.

The pipes 12 have portions of their lengths formed of canvas or analogous flexible material as indicated at 15, so as to permit of the adjustment of the positions of the nozzle ends of the pipes to accommodate rows of cotton of different distances apart and also to accommodate unevenness in the rows. Shoes 16 are formed upon the terminals of the pipes 12 and they extend rearwardly from the terminals of the pipes as clearly shown in Fig. 5 of the drawings. The under surface of the shoes 16 and the pipes 12 are inclined upwardly, as shown at 18, so that they will gradually ride over the cotton plants and bend them slightly as the shoes and pipes pass over the plants.

The air suction through the pipes 12 will draw the boll weevils off of the cotton plant, upwardly through the nozzle ends of the pipes 12 and into the compartment 8. Small sticks, trash or the like will also be drawn upwardly into the compartment 8. The air suction passing through the foraminous partition 8 will cause the boll weevils and trash to cling thereto, and when a sufficient quantity of weevils are accumulated upon the screen 8 so as to interfere with the air suction, the valve structure generically indicated by the numeral 20 may be closed for cutting off the air suction through the screen, which will relieve the suction against the weevils and trash, and allow them to fall downwardly out of the compartment 10 into a trough 21 which is positioned beneath the receptacle 7 and directly in alinement with the compartment 10 adjacent to the screen or foraminous partition 8. The trough 21 extends entirely across the under surface of the receptacle 12 and projects outwardly beyond one end of the same forming an elongated portion or box 22 into which the boll weevils and trash are drawn by a rake structure 23. The rake structure 23 includes a head 24 and a handle 25 which is composed of a plurality of hingedly connected sections as clearly shown in Fig. 4 of the drawings, whereby the handle may be folded when desired. The head 24 of the rake structure 23 is shaped so that it will form a closure for the outer end of the trough 21, cutting off communication between the box 22 and the trough 21 as shown in Fig. 4, thereby preventing air suction from drawing the boll weevils out of the box 22 inwardly into the compartment 8 during the operation of the device. A hinged door 26 is carried by the outer end of the box 22 by means of which the boll weevils and trash may be removed therefrom for being treated with kerosene, crude oil or other suitable material for killing them.

The valve structure 20, is of the ordinary shutter type, including a plurality of pivotally mounted blades 30, which are connected together and to a hand lever 31 by means of a rod 32, so that all of the blades may be moved into a substantially horizontal position at the same time, for opening the valve or to a substantially vertical position for closing the valve. The lever 31 is pivotally connected as shown at 32, and it has a dog mechanism 33 carried thereby which coacts with a quadrant 34 for holding the lever in adjusted positions.

From the foregoing description taken in connection with the accompanying drawings, the advantages of construction and of the method of operation of the improved boll weevil destroying machine will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a boll weevil destroying machine, the combination of a portable supporting structure, a receptacle carried by said supporting structure, a foraminous partition extending through said receptacle and dividing it into compartments, an ordinary air suction fan, the inlet of said fan communicating with one of said receptacle compartments, a pair of plant engaging nozzles communicating with the other of said compartments whereby the air will be drawn inwardly through said nozzles, through said foraminous partition and into the fan, a shutter valve structure carried by said receptacle between said foraminous partition and said fan inlet whereby the air suction through said foraminous partition may be regulated as desired, and a trough positioned beneath said receptacle and adapted for receiving boll weevils from the compartment with which said nozzles communicate.

2. In a boll weevil destroying machine, the combination, of a portable supporting frame, an ordinary air suction fan carried by said supporting frame, means for propelling said fan, a plurality of suction nozzles connected to the air inlet of said fan, an air inlet pipe for said fan, a foraminous partition extending between said nozzles and said air suction pipe, a shutter valve structure positioned between said air suction pipe and said foraminous partition for cutting off the suction of air through said nozzles and said partition, and means positioned beneath said partition for receiving boll weevils therefrom upon the cutting off of air suction therethrough.

3. In a boll weevil destroying machine, the combination of a portable supporting structure, a receptacle carried by said supporting structure, a foraminous partition extending through said receptacle and dividing it into compartments, an ordinary air suction fan, the inlet of said fan communicating with one of said receptacle compartments, a pair of plant engaging nozzles communicating with the other of said compartments whereby the air will be drawn inwardly through said nozzles, through said foraminous partition and into said fan, a trough positioned beneath said receptacle and adapted for receiving boll weevils from the compartment with which said nozzles communicate, a box communicating with said trough, and a rake structure carried by said trough for drawing the boll weevils out of the trough into said box.

In testimony whereof I affix my signature in presence of a witness.

JAMES H. NOLIN.

Witness:
JERRY L. DOWLING.

Copies of this patent may be obtained for five cents each, by addressing the "Commissioner of Patents, Washington, D. C."